(12) United States Patent
Kobayashi et al.

(10) Patent No.: US 9,367,184 B2
(45) Date of Patent: Jun. 14, 2016

(54) METHOD OF REDUCING OFFSET IN A CAPACITIVE TOUCH PANEL CAPABLE OF SWITCHING BETWEEN A DIFFERENTIAL-INPUT SENSOR CIRCUIT AND SINGLE-ENDED SENSOR CIRCUIT

(71) Applicant: Semiconductor Components Industries, LLC, Phoenix, AZ (US)

(72) Inventors: Kazuyuki Kobayashi, Midori (JP); Yasuhiro Kaneta, Isesaki (JP)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 420 days.

(21) Appl. No.: 13/891,740

(22) Filed: May 10, 2013

(65) Prior Publication Data
US 2013/0269177 A1 Oct. 17, 2013

Related U.S. Application Data

(63) Continuation of application No. 12/948,180, filed on Nov. 17, 2010, now Pat. No. 8,441,462.

(30) Foreign Application Priority Data

Nov. 25, 2009 (JP) .................. 2009-267515

(51) Int. Cl.
   *G06F 3/041* (2006.01)
   *G06F 3/044* (2006.01)
(52) U.S. Cl.
   CPC .............. *G06F 3/044* (2013.01); *G06F 3/0418* (2013.01)
(58) Field of Classification Search
   CPC .................. G06F 3/0418; G06F 3/044; G06F 2203/04106
   See application file for complete search history.

(56) References Cited

U.S. PATENT DOCUMENTS

| 4,859,814 A * | 8/1989 | Sciacero et al. ........... 178/18.02 |
| 2007/0163815 A1* | 7/2007 | Ungaretti et al. .......... 178/18.06 |
| 2007/0268272 A1* | 11/2007 | Perski et al. ................... 345/173 |
| 2009/0124223 A1* | 5/2009 | Kyranas et al. ............... 455/143 |
| 2009/0295409 A1* | 12/2009 | Irkliy ............................. 324/658 |
| 2010/0315363 A1* | 12/2010 | Kobayashi .............. G06F 3/044 345/173 |
| 2011/0109585 A1* | 5/2011 | Kwon ................... G06F 3/0418 345/174 |
| 2011/0248723 A1* | 10/2011 | Yeh .......................... G01D 5/24 324/601 |
| 2012/0169641 A1* | 7/2012 | Wang et al. .................... 345/173 |

FOREIGN PATENT DOCUMENTS

JP  2005-190950  7/2005

* cited by examiner

*Primary Examiner* — Chanh Nguyen
*Assistant Examiner* — Navin Lingaraju
(74) *Attorney, Agent, or Firm* — Robert F. Hightower (57) ABSTRACT

This invention offers a signal processing circuit of an electrostatic capacity type touch panel which is capable of switching between a differential input mode and a single input mode and has an extended adjustable range of an offset in the single input mode. The signal processing circuit of this invention includes a first sensor circuit of a differential input type, a second sensor circuit of a single input type, a third and fourth electrostatic capacitors that are variable capacitors for calibration to adjust the offset in an output voltage of the first sensor circuit, and a switching control circuit to control so as to put in operation one of the first and second sensor circuits. The switching control circuit also controls so that the third and fourth electrostatic capacitors for calibration are connected in parallel to each other when the second sensor circuit is put in operation.

11 Claims, 10 Drawing Sheets

FIG.6A
CHARGE ACCUMULATION MODE

FIG.6B
CHARGE TRANSFER MODE

FIG.9A
CHARGE ACCUMULATION MODE

FIG.9B
CHARGE TRANSFER MODE

Figure 11:
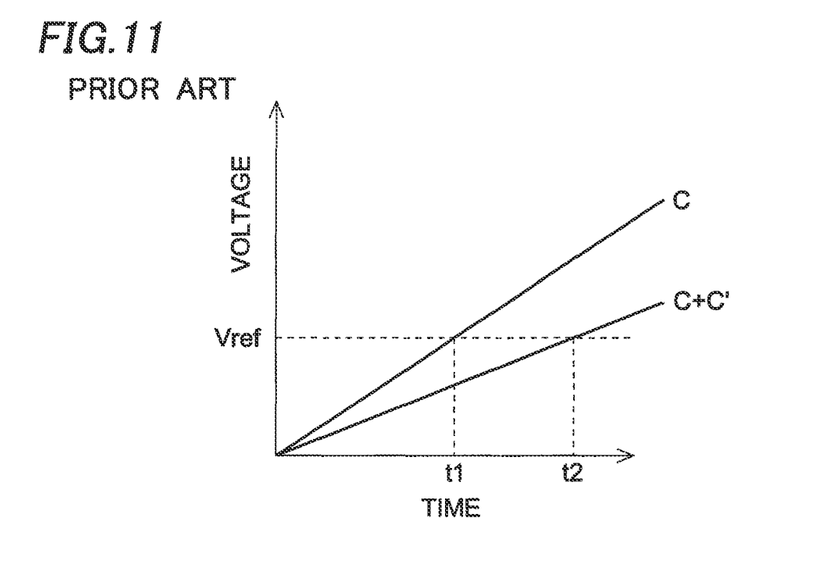
FIG. 11 is to explain operations of the conventional signal processing circuit of the electrostatic capacity type touch panel.

FIG.14 ated with the sense line 61 is C. In this case, a voltage at the sense line 61 increases from 0 V in a reset state as the electrostatic capacitor 62 connected with the sense line 61 is charged by a constant current from the constant current power supply 65. An output voltage of the differential amplifier 63 is inverted when the voltage at the sense line 61 reaches the reference voltage Vref. A length of time from the reset state to the inversion of the differential amplifier 63 in this case is referred to as t1.

METHOD OF REDUCING OFFSET IN A CAPACITIVE TOUCH PANEL CAPABLE OF SWITCHING BETWEEN A DIFFERENTIAL-INPUT SENSOR CIRCUIT AND SINGLE-ENDED SENSOR CIRCUIT

CROSS-REFERENCE OF THE INVENTION

This application claims priority from Japanese Patent Application No. 2009-267415, the content of which is incorporated herein by reference in its entirety. The present application is a continuation application of prior U.S. application Ser. No. 12/948,180, filed on Nov. 17, 2010, now U.S. Pat. No. 8,441,462 having at least one common inventor, and a common assignee, which is hereby incorporated herein by reference, and priority thereto for common subject matter is hereby claimed.

BACKGROUND OF THE INVENTION

1. Field of the Invention

This invention relates to a signal processing circuit of an electrostatic capacity type touch panel.

2. Description of the Related Art

The electrostatic capacity type touch sensor has been known as a data input device to various kinds of electronic devices such as a mobile phone, a portable audio device, a portable game console, a television and a personal computer.

Figure 10:
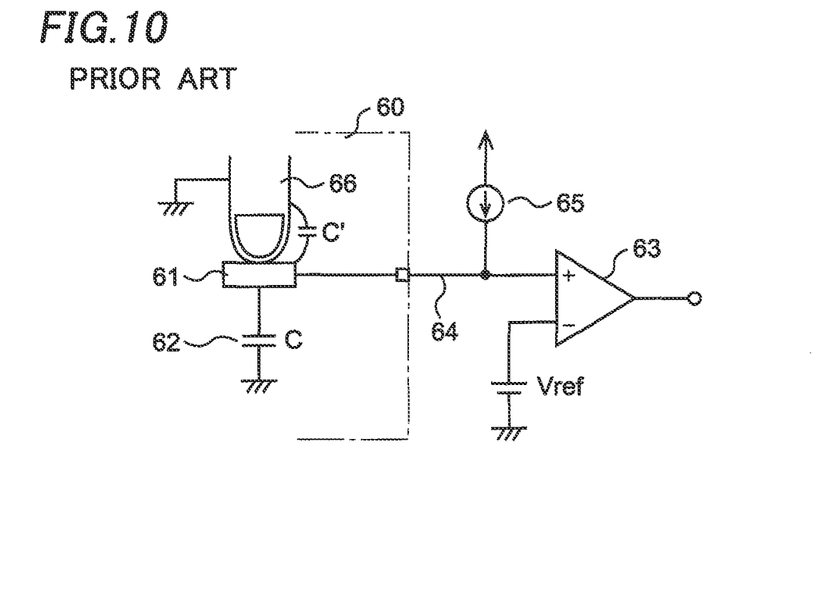
FIG. 10 shows a structure of a conventional signal processing circuit of an electrostatic capacity type touch panel.

A conventional signal processing circuit of an electrostatic capacity type touch panel is explained referring to FIG. 10 and FIG. 11. A sense line 61 (touch pad) that has an electrostatic capacitor 62 having a capacitance C is disposed on a touch panel 60, as shown in FIG. 10.

The sense line 61 is connected to a non-inverting input terminal (+) of a differential amplifier 63 (comparator) through a wiring 64. A reference voltage Vref is applied to an inverting input terminal (−) of the differential amplifier 63. A constant current power supply 65 is connected to the wiring 64 that connects between the sense line 61 and the non-inverting input terminal (+) of the differential amplifier 63.

Operations of the signal processing circuit of the electrostatic capacity type touch panel are explained referring to FIG. 11. When a finger 66 of an operator is far away from the sense line 61, a capacitance associated with the sense line 61 is C. In this case, a voltage at the sense line 61 increases from 0 V in a reset state as the electrostatic capacitor 62 connected with the sense line 61 is charged by a constant current from the constant current power supply 65. An output voltage of the differential amplifier 63 is inverted when the voltage at the sense line 61 reaches the reference voltage Vref. A length of time from the reset state to the inversion of the differential amplifier 63 in this case is referred to as t1.

When the finger 66 of the operator approaches the sense line 61, on the other hand, the capacitance associated with the sense line 61 increases to C+C'. The increment C' is a capacitance of a capacitor formed between the finger 66 of the operator and the sense line 61. As a result, the length of time that the voltage at the sense line 61 takes from 0 V to the reference voltage Vref increases to t2 (t2>t1). That is, it is possible to detect whether the finger 66 of the operator has touched the sense line 61 or not, based on a difference (t2−t1) in the length of time taken by the transition from the reset state to the inversion of the differential amplifier 63.

Technologies mentioned above are disclosed in Japanese Patent Application Publication No. 2005-190950, for example.

However, the signal processing circuit described above is a single input type in which a signal from the single sense line 61 is inputted to the differential amplifier 63, and has a problem that the voltage at the sense line 61 is varied to cause malfunctioning when a noise is applied to the sense line 61.

On the other hand, a differential input type signal processing circuit in which a difference between capacitances associated with two sense lines is detected by an electric charge amplifier is tolerant of the noise and is capable of forming a high sensitivity touch sensor. The differential input type signal processing circuit is suitable for a single-touch, which means that only one sense line is touched, but has a problem that a touch position can be not detected in the case of a multi-touch, which means that two or more than two sense lines are simultaneously touched. The problem is caused because the difference between the capacitances of the two sense lines is lost.

SUMMARY OF THE INVENTION

This invention provides a signal processing circuit of an electrostatic capacity type touch panel that has a plurality of sense lines including first and second sense lines and a drive line to which an alternating current drive signal is applied. The signal processing circuit includes a first sensor circuit of a differential input type which selects the first and second sense lines out of the plurality of sense lines and detects a difference between a capacitance of a first electrostatic capacitor formed between the first sense line and the drive line and a capacitance of a second electrostatic capacitor formed between the second sense line and the drive line, a second sensor circuit of a single input type which selects the first sense line out of the plurality of sense lines and detects a change in the capacitance of the first electrostatic capacitor formed between the first sense line and the drive line, first and second variable capacitors for calibration adjusting an offset in an output voltage of the first sensor circuit, and a switching control circuit to control the first and second sensor circuits so that either the first sensor circuit or the second sensor circuit is put in operation and to control the first and second variable capacitors for calibration so that the first and second variable capacitors are connected in parallel to each other when the second sensor is put in operation.

DETAILED DESCRIPTION OF THE INVENTION

Figure 1:
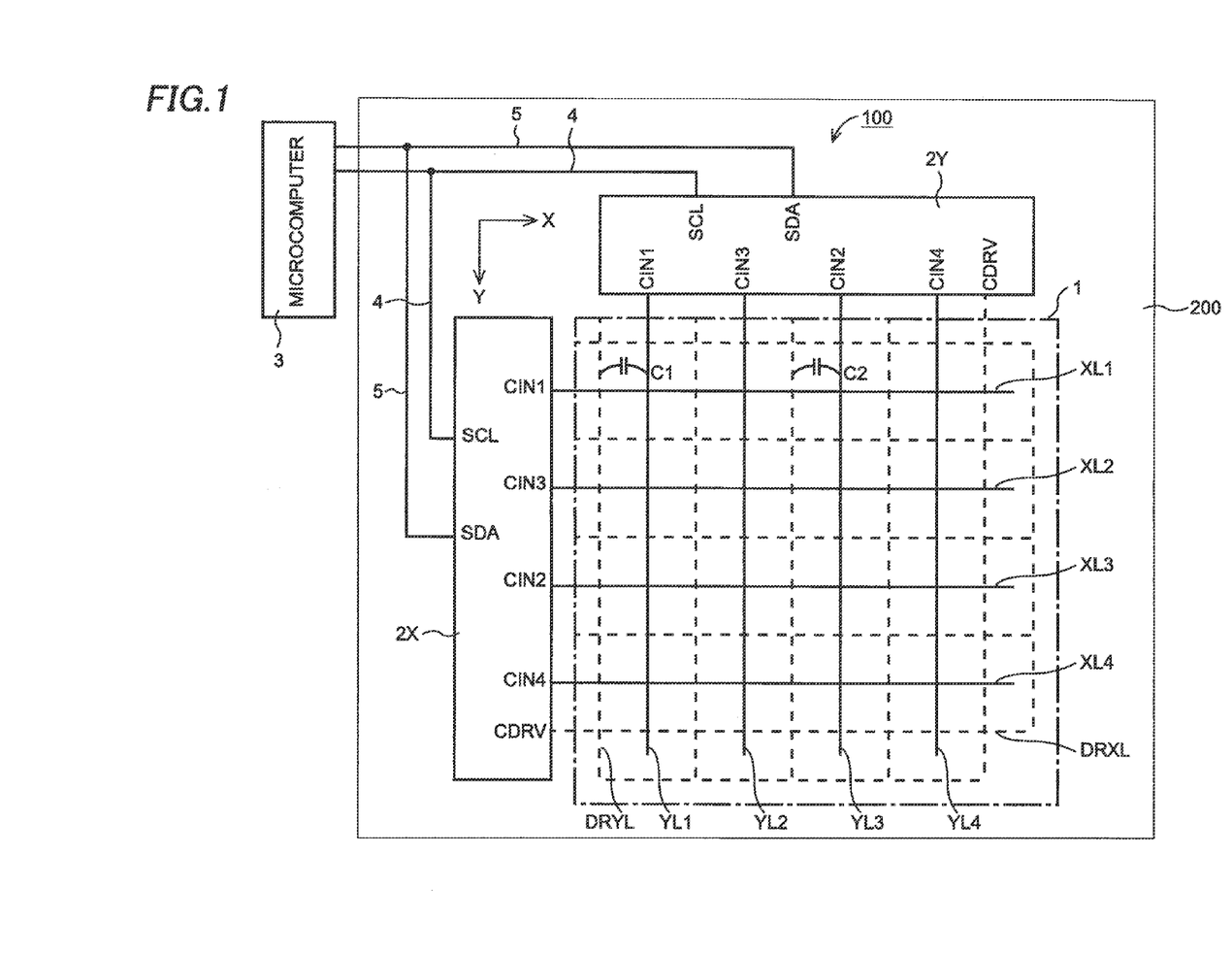
FIG. 1 shows a structure of a touch sensor including an electrostatic capacity type touch panel and signal processing circuits.

A signal processing circuit of an electrostatic capacity type touch panel according to an embodiment of this invention is hereafter described referring to the drawings. An electrostatic capacity type touch sensor 100 is formed to include a touch panel 1, signal processing circuits 2X and 2Y and a microcomputer 3, as shown in FIG. 1. The signal processing circuits 2X and 2Y can be implemented with a single chip.

The touch panel 1 has X sense lines XL1-XL4 and an X drive line DRXL extending in an X direction on a glass substrate 200. The X drive line DRXL is disposed on both sides of each of the X sense lines XL1-XL4. The touch panel 1 also has Y sense lines YL1-YL4 and a Y drive line DRYL extending in a Y direction on the glass substrate 200 and intersecting the X sense lines XL1-XL4. The Y drive line DRYL is disposed on both sides of each of the Y sense lines YL1-YL4. The X sense lines XL1-XL4, the X drive line DRXL, the Y sense lines YL1-YL4 and the Y drive line DRYL are electrically insulated from each other with a dielectric layer or the like.

The signal processing circuits 2X and 2Y are disposed adjacent the touch panel 1 on the glass substrate 200. It is preferable that the signal processing circuits 2X and 2Y are implemented with an LSI chip or formed on the glass substrate 200 using a thin film transistor (TFT) process.

The signal processing circuit 2X has first through fourth input terminals CIN1-CIN4 and a drive terminal CDRV outputting a alternating current drive signal SCDRV (amplitude voltage Vref). The first input terminal CIN1 is connected to the X sense line XL1, the second, input terminal CIN2 is connected to the X sense line XL3, the third input terminal CIN3 is connected to the X sense line XL2 and the fourth input terminal CIN4 is connected to the X sense line XL4. The drive terminal CDRV is connected to the X drive line DRXL.

Similarly, the signal processing circuit 2Y has first through fourth input terminals CIN1-CIN4 and a drive terminal CDRV outputting a alternating current drive signal SCDRV (amplitude voltage Vref). The first input terminal CIN1 is connected to the Y sense line YL1, the second input terminal CIN2 is connected to the Y sense line YL3, the third input terminal CIN3 is connected to the Y sense line YL2 and the fourth input terminal CIN4 is connected to the Y sense line YL4. The drive terminal CDRV is connected to the Y drive line DRYL.

In addition, each of the signal processing circuits 2X and 2Y has a serial clock terminal SCL and a serial data terminal SDA. Both of the serial clock terminals SCL are connected to a serial clock line 4, while both of the serial data terminals SDA are connected to a serial data line 5. In this case, the serial clock line 4 and the serial data line 5 constitute an I²C (Inter-Integrated Circuit) bus.

A microcomputer 3, that is a master device, is provided on a PCB substrate (not shown) outside the glass substrate 200. The serial clock line 4 and the serial data line 5 are connected to the microcomputer 3 through an FPC (Flexible Printed Circuit) or the like. With the structure described above, it is made possible that data communication is performed between the microcomputer 3 and the signal processing circuits 2X and 2Y. Although the microcomputer is used as the master device in the example described above, device other than the microcomputer such as a DSP (Digital Signal Processor) or a logic circuit may be used. Also, although the I²C bus is used in the serial communication in the example described above, other serial communication such as an SPI (Serial Peripheral Interface) or UART (Universal Asynchronous Receiver Transmitter) may be used.

Although the X sense lines XL1-XL4 and the Y sense lines YL1-YL4 are made of four each of sense lines that make the minimum size of the touch panel 1, the number of sense lines may be increased as required. In that case, each of the signal processing circuits 2X and 2Y is to be expanded. Or the number of the sense lines is to be increased when the signal processing circuits are implemented with a single chip.

Figure 2:
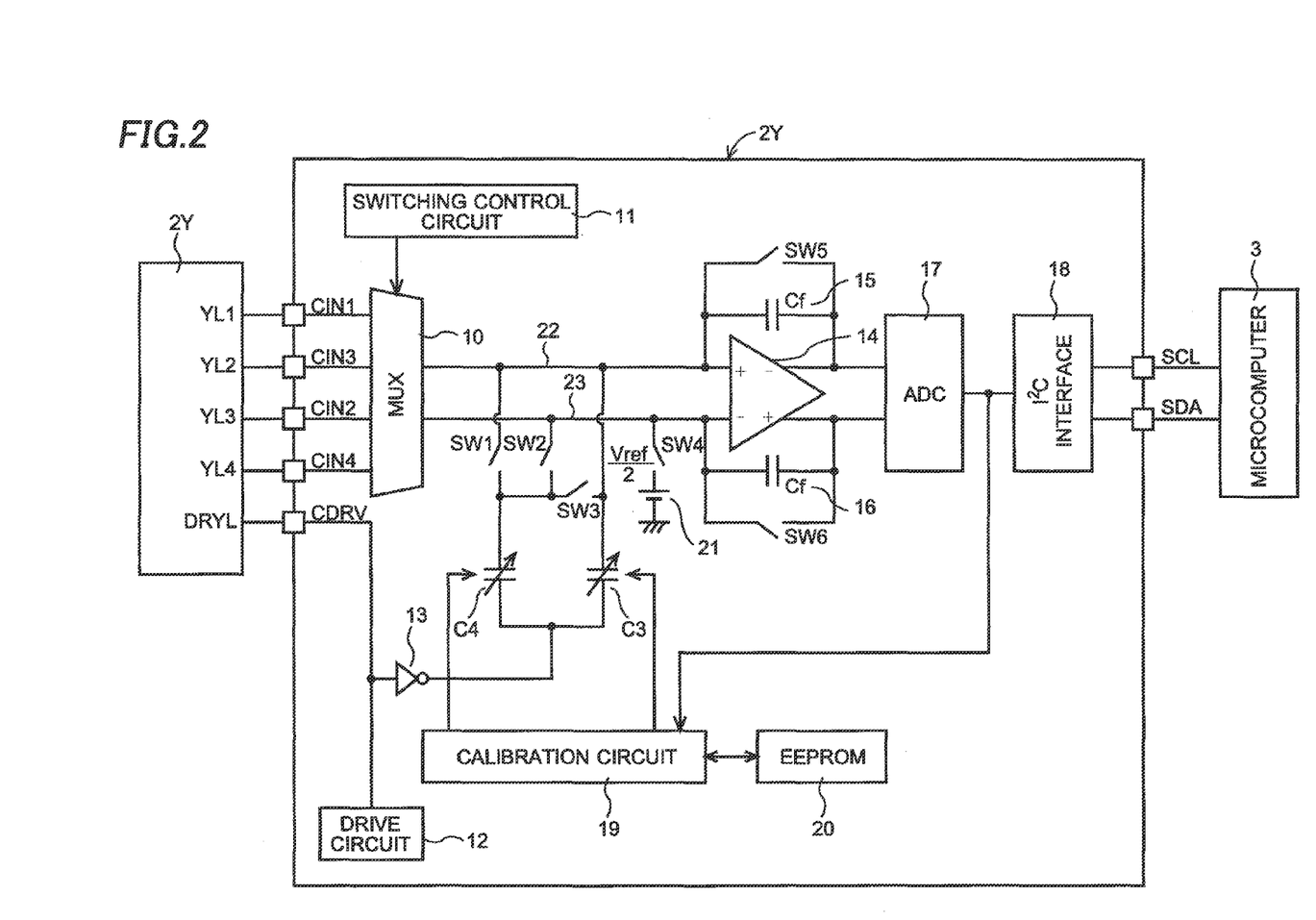
FIG. 2 shows a structure of a signal processing circuit of an electrostatic capacity type touch panel according to an embodiment of this invention.

A detailed structure of each of the signal processing circuits 2X and 2Y of the electrostatic capacity type touch panel is hereafter described referring to FIG. 2. Since the structure of the signal processing circuit 2X is identical to the structure of the signal processing circuit 2Y, it is good enough to describe only the structure of the signal processing circuit 2Y.

The signal processing circuit 2Y is formed to include a selection circuit 10, a switching control circuit 11, a drive circuit 12 that generates the alternating current drive signal SCDRV, an inverter 13, a third electrostatic capacitor C3, a fourth electrostatic capacitor C4, a differential amplifier 14, a first feedback capacitor 15, a second feedback capacitor 16, an A/D converter 17, an I²C bus interface circuit 18, a calibration circuit 19, an EEPROM 20, switches SW1-SW6 and a reference voltage source 21 that generates a reference voltage ½ Vref that is a half of an amplitude voltage Vref of the alternating current drive signal SCDRV.

The signal processing circuit 2Y has a differential input mode and a single input mode. Switching between the differential input mode and the single input mode is performed by turning the switches SW1-SW4 on/off with the switching control circuit 11 and by switching selecting operation with the selection circuit 10.

The switch SW1 is connected between the fourth electrostatic capacitor C4 and a wiring 22 that connects between a first output of the selection circuit 10 and a non-inverting input terminal (+) of the differential amplifier 14. The switch SW2 is connected between the fourth electrostatic capacitor C4 and a wiring 23 that connects between a second output of the selection circuit 10 and an inverting input terminal (−) of the differential amplifier 14.

The switch SW3 is connected between one end of the third electrostatic capacitor C3 and one end of the fourth electrostatic capacitor C4 so that the third electrostatic capacitor C3 and the fourth electrostatic capacitor C4 are connected in parallel. The switch SW4 is connected between the reference voltage source 21 and the inverting input terminal (−) of the differential amplifier 14 so that the reference voltage ½ Vref is selectively applied to the inverting input terminal (−) of the differential amplifier 14. It is preferable that the switches SW1-SW4 are made of CMOS analog switches.

Table 1 shows on/off positions of the switches SW1-SW4 in the differential input mode and the single input mode.

TABLE 1

| Switch | Mode | |
|--------|------|------|
|        | Differential Input Mode | Single Input Mode |
| SW1 | OFF | ON |
| SW2 | ON | OFF |
| SW3 | OFF | ON or OFF |
| SW4 | OFF | ON |

(a) In the differential input mode, the switch SW is turned off, the switch SW2 is turned on, the switch SW3 is turned off and the switch SW4 is turned off. The selection circuit 10 has a first phase and a second phase. In the first phase, it selects signals from the first input terminal CIN1 and the second input terminal CIN2. That is, the first input terminal CIN1 is connected to the non-inverting input terminal (+) of the differential amplifier 14 through the wiring 22, and the second input terminal CIN2 is connected to the inverting input terminal (−) of the differential amplifier 14 through the wiring 23.

The selection circuit 10 selects signals from the third input terminal CIN3 and the fourth input terminal CIN4 in the second phase. That is, the third input terminal CIN3 is connected to the non-inverting input terminal (+) of the differential amplifier 14 through the wiring 22, and the fourth input terminal CIN4 is connected to the inverting input terminal (−) of the differential amplifier 14 through the wiring 23.

Figure 3:
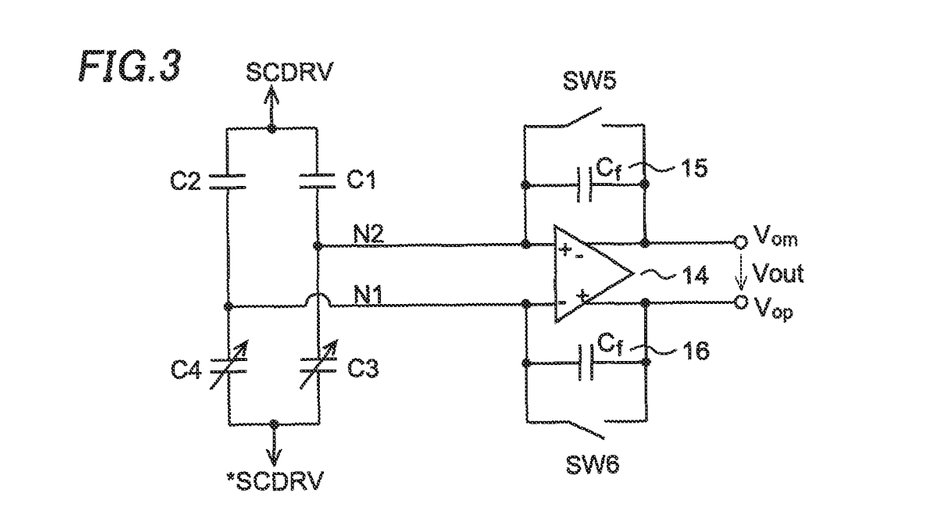
FIG. 3 shows a structure of a first sensor circuit of a differential input type.

As a result, there is formed a first sensor circuit of a differential input type, as shown in FIG. 3. FIG. 3 shows a case of the first phase in which the selection circuit 10 selects the signals from the first input terminal CIN1 and the second input terminal CIN2. In this case, a first electrostatic capacitor C1 is formed between the Y sense line YL1 connected to the first input terminal CIN1 and the Y drive line DRYL, while a second electrostatic capacitor C2 is formed between the Y sense line YL3 connected to the second input terminal CIN2 and the Y drive line DRYL, as shown in FIG. 1.

Then, the first electrostatic capacitor C1 is connected in series with the third electrostatic capacitor C3, while the second electrostatic capacitor C2 is connected in series with the fourth electrostatic capacitor C4, as shown in FIG. 3. The alternating current drive signal SCDRV from the drive circuit 12 is applied to a common connection node of the first electrostatic capacitor C1 and the second electrostatic capacitor C2, that is, the Y drive line DRYL. Also, an inverted alternating current drive signal*SCDRV, that is generated by inverting the alternating current drive signal SCDRV from the drive circuit 12 with the inverter 13, is applied to a common connecting node of the third electrostatic capacitor C3 and the fourth electrostatic capacitor C4.

A connecting node N2 between the first electrostatic capacitor C1 and the third electrostatic capacitor C3 is connected to the non-inverting input terminal (+) of the differential amplifier 14. A connecting node N1 between the second electrostatic capacitor C2 and the fourth electrostatic capacitor C4 is connected to the inverting input terminal (−) of the differential amplifier 14.

The first feedback capacitor 15 and the switch SW5 are connected between an inverting output terminal (−) and the non-inverting input terminal (+) of the differential amplifier 14, while the second feedback capacitor 16 and the switch SW6 are connected between a non-inverting output terminal (+) and the inverting input terminal (−) of the differential amplifier 14.

It is preferable that the switches SW5 and SW6 are made of CMOS analog switches in order to have good linearity in signal transfer characteristics. Also, it is preferable that the first and second feedback capacitors (Cf) 15 and 16 have the same capacitance CAf.

The first sensor circuit of the differential input type outputs an output voltage Vout that corresponds to a difference between a capacitance CA1 of the first electrostatic capacitor C1 and a capacitance CA2 of the second electrostatic capacitor C2. Its detailed operation is to be described.

(b) In the single input mode, the switch SW1 is turned on, the switch SW2 is turned off, the switch SW3 is turned on and the switch SW4 is turned on. The selection circuit 10 sequentially selects each of the signals from the first input terminal CIN1, the third input terminal CIN3, the second input terminal CIN2 and the fourth input terminal CIN4 one after another, and applies the selected signal to the non-inverting input terminal (+) of the differential amplifier 14 through the wiring 22 as a first output.

Figure 4:
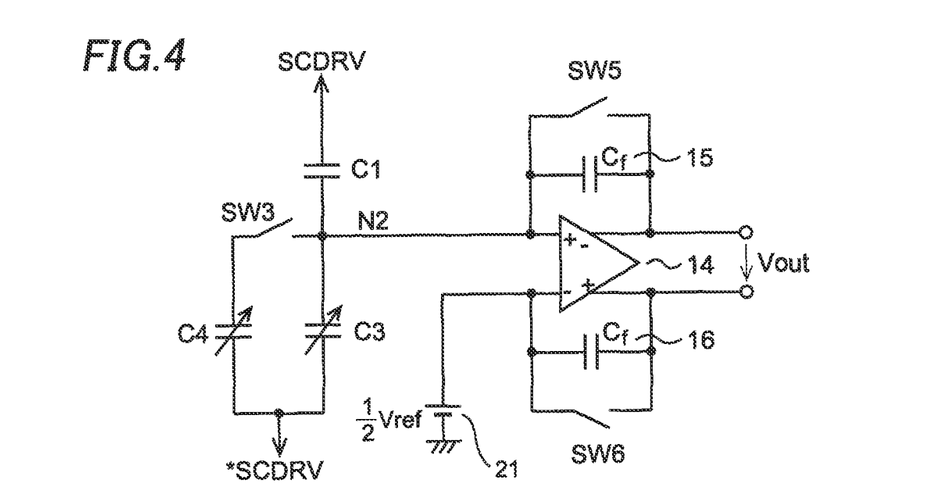
FIG. 4 shows a structure of a second sensor circuit of a single input type.

As a result, there is formed a second sensor circuit of a single input type, as shown in FIG. 4. FIG. 4 shows a case in which the selection circuit 10 selects the signal from the first input terminal CIN1. In this case, the first electrostatic capacitor C1 is formed between the Y sense line YL1 connected to the first input terminal CIN1 and the Y drive line DRYL, as shown in FIG. 1.

Then, the first electrostatic capacitor C1 is connected in series with the third electrostatic capacitor C3, as shown in FIG. 4. The fourth electrostatic capacitor C4 is not connected in series with the first electrostatic capacitor C1 when the switch SW3 is turned off. On the other hand, the fourth electrostatic capacitor C4 is connected in series with the first electrostatic capacitor C1 when the switch SW3 is turned on. That is, the third electrostatic capacitor C3 and the fourth electrostatic capacitor C4 are connected in parallel to each other, and a compound electrostatic capacitor C5 composed of them is connected in series with the first electrostatic capacitor C.

The alternating current drive signal SCDRV from the drive circuit 12 is applied to one end of the first electrostatic capacitor C1, which is the Y drive line DRYL in this case. Also, the inverted alternating current drive signal*SCDRV, that is generated by inverting the alternating current drive signal SCDRV from the drive circuit 12 with the inverter 13, is applied to the common connecting node of the third electrostatic capacitor C3 and the fourth electrostatic capacitor C4.

The connecting node N2 between the first electrostatic capacitor C1 and the third electrostatic capacitor C3 is connected to the non-inverting input terminal (+) of the differential amplifier 14. The reference voltage ½ Vref from the reference voltage source 21 is applied to the inverting input terminal (−) of the differential amplifier 14.

The second sensor circuit of the single input type outputs an output voltage Vout that corresponds to a difference between the capacitance CA1 of the first electrostatic capacitor C1 and a capacitance CA3 of the third electrostatic capacitor C3 when the switch SW3 is turned off, and outputs an output voltage Vout that corresponds to a difference between the capacitance CA1 of the first capacitor C1 and a capacitance CA5 of the compound electrostatic capacitor C5 when the switch SW3 is turned on. Its detailed operation is to be described.

Since the third electrostatic capacitor C3 or both the third electrostatic capacitor C3 and the fourth electrostatic capacitor C4 in the first sensor circuit of the differential input type is used as a reference capacitor in the second sensor circuit of the single input type, an increase in the number of capacitors can be suppressed in the case where the single input type and the differential input type are switched.

Because the output voltage Vout of the first and second sensor circuits is an analog signal, it can be not digital-signal-processed as it is. Thus, the output voltage Vout is converted into a digital signal with the A/D converter 17. An output of the A/D converter 17 is converted into serial data in a predetermined format by the I²C bus interface circuit 18, and transmitted to the microcomputer 3 through the serial clock terminal SCL and the serial data terminal SDA. The microcomputer 3 processes the serial data it received, and determines a touch position on the touch panel 1.

Calibration performed by the first and second sensor circuits described above is explained referring to FIG. 2 and FIG. 5.

There is caused an offset in the output voltage Vout of the first sensor circuit of the differential input type, when there is an imbalance between the capacitance CA1 of the first electrostatic capacitor C1 and the capacitance CA2 of the second electrostatic capacitor C2, that is, when there is a difference between them, in an initial state (a state in which a finger of an operator or the like is too far away to be detected). When the offset is caused, detection accuracy of the touch sensor is degraded. The offset can be adjusted when the third and fourth electrostatic capacitors C3 and C4 are formed of variable capacitors.

That is, the calibration circuit 19 adjusts the capacitances CA3 and CA4 of the third and fourth electrostatic capacitors C3 and C4 so that the offset becomes a desired value, which is preferably a minimum value, based on the output voltages Vout (preferably digital values after the A/D conversion) of the first and second sensor circuits in the initial state, as shown in FIG. 2.

As for the calibration of the first sensor circuit of the differential input type (Refer to FIG. 3.), it is preferable that the capacitances CA1-CA4 of the first through fourth electrostatic capacitors C1-C4 are equal to each other (CA1=CA2=CA3=CA4) in the initial state. However, there is caused the offset in the output voltage Vout when the capacitance CA1 of the first electrostatic capacitor C1 is larger than the capacitance CA2 of the second electrostatic capacitor C2 by $\Delta C$ (CA1=C+$\Delta C$, CA2=C) due to variations in the manufacturing process of the touch panel 1, for example. The offset can be reduced to a minimum value (zero) by adjusting the capacitances CA3 and CA4 of the third and fourth electrostatic capacitors C3 and C4 so that the capacitance CA3 is larger than the capacitance CA4 by $\Delta C$ (CA3=C+$\Delta C$, CA4=C).

When the capacitance CA1 of the first electrostatic capacitor C1 is smaller than the capacitance CA2 of the second electrostatic capacitor C2 by $\Delta C$ (CA1=C−$\Delta C$, CA2=C), on the other hand, the capacitances CA3 and CA4 of the third and fourth electrostatic capacitors C3 and C4 are adjusted so that the capacitance CA3 is smaller than the capacitance CA4 by $\Delta C$ (CA3=C−$\Delta C$, CA4=C).

Figure 5:
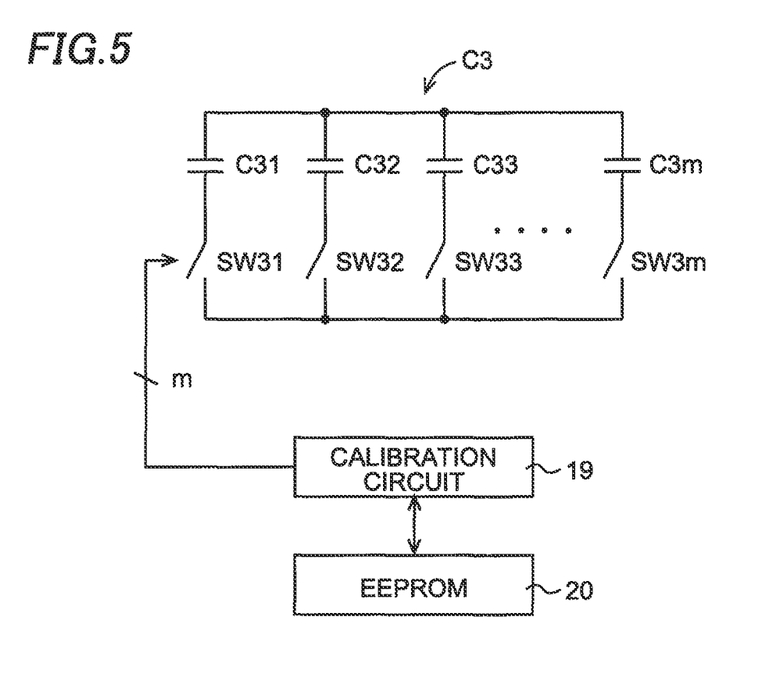
FIG. 5 shows a structure of a variable capacitor.

As an example structure of the third electrostatic capacitor C3 in this case, the third electrostatic capacitor C3 is formed to include m electrostatic capacitors C31-C3m and in switches S31-S3m, as shown in FIG. 5. It is preferable that capacitances CA31-CA3m of the electrostatic capacitors C31-C3m are weighted so that the capacitance CA3 of the third electrostatic capacitor C3 may be fine-adjusted. For example, when the capacitance CA31 of the electrostatic capacitor C31 is denoted as C0, CA32=½C0, CA33=¼C0, CA34=⅛C0, . . . CA3m==½$^{m-1}$ C0. Each of the switches S31-S3m is turned on and off by corresponding each of m-bits of adjustment signals from the calibration circuit 19. The same applies to the fourth electrostatic capacitor C4.

With the structure described above, the capacitances CA3 and CA4 of the third and fourth electrostatic capacitors C3 and C4 can be adjusted by the corresponding 2m-bits of digital adjustment signals from the calibration circuit 19. The calibration circuit 19 can determine the 2m-bits of adjustment signals with which the offset becomes a desired value, which is preferably the minimum value, based on the output voltage Vout. The determined adjustment signals are written into and retained in an electrically writable/erasable non-volatile memory such as the EEPROM 20.

Then, the adjustment signals written into and retained in the EEPROM 20 are read-out from the EEPROM 20 when a power supply to the signal processing circuits 2X and 2Y is turned on. The calibration circuit 19 adjusts the capacitances CA3 and CA4 of the third and fourth electrostatic capacitors C3 and C4 based on the adjustment signals read-out from the EEPROM 20.

As for the second sensor circuit of the single input type (Refer to FIG. 4), on the other hand, it is preferable that the capacitance CA1 of the first electrostatic capacitor C1 and the capacitance CA3 of the third electrostatic capacitor C3 are equal to each other (CA1=CA3=C) in the initial state. Note that this is for the case where the switch SW3 is turned off.

However, there is caused the offset in the output voltage Vout when the capacitance CA1 of the first electrostatic capacitor C1 is larger than the capacitance CA3 of the third electrostatic capacitor C3 by $\Delta C$ (CA1=CA3+$\Delta C$). The offset can be reduced by adjusting the capacitance CA3 of the third capacitor C3 so that the capacitance CA3 approaches the capacitance CA1 of the first electrostatic capacitor C1.

When the switch SW3 in the second sensor circuit of the single input type is turned on, the capacitance CA5 of the compound electrostatic capacitor C5, which is composed of the third capacitor C3 and the fourth capacitor C4, is adjusted in the same way as described above, in order to minimize the offset. In this case, a variable range of the capacitance CA5 can be extended because the electrostatic capacitor C5 is the compound electrostatic capacitor, resulting in an advantage that an adjustable range of the offset is extended.

Figure 12:
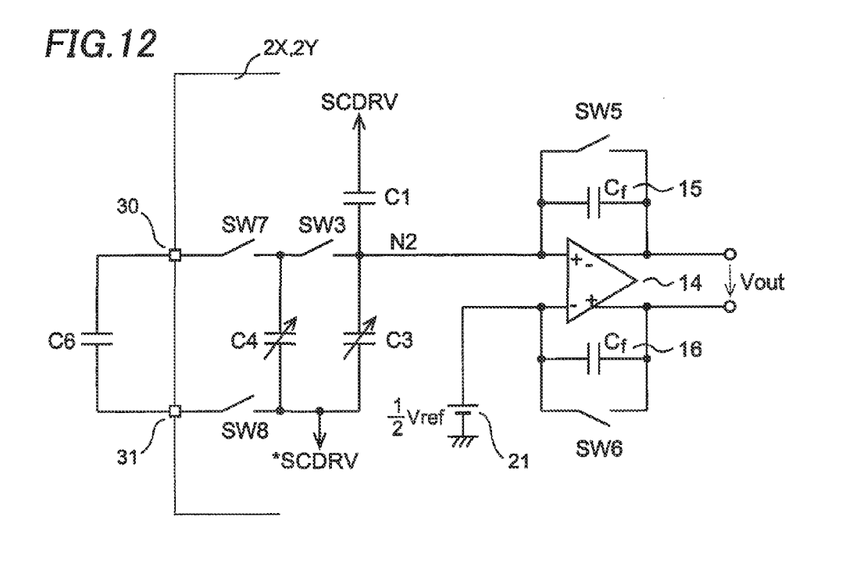
FIG. 12 shows a structure of the second sensor circuit of the single input type.

When the touch panel is large in size, there is a case where the third electrostatic capacitor C3 and the fourth electrostatic capacitor C4 incorporated in the signal processing circuits 2X and 2Y alone could not provide large enough capacitance because the capacitance CA1 of the first electrostatic capacitor C1 in the touch panel becomes extremely large. In that case, it is preferable that an external capacitor C6 is provided outside the signal processing circuits 2X and 2Y so that it can be connected in parallel with the third electrostatic capacitor C3 and the fourth electrostatic capacitor C4 in the second sensor circuit of the single input type, as shown in FIG. 12.

In this case, each of the signal processing circuits 2X and 2Y is provided with dedicated terminals 30 and 31 between which the external capacitor C6 is connected. A switch SW7 is connected between one end of the fourth electrostatic capacitor C4 and the dedicated terminal 30, while a switch SW8 is connected between another end of the fourth electrostatic capacitor C4 and the dedicated terminal 31. With this, the external capacitor C6 can be added to complement the insufficient capacitance by turning on the switches SW7 and SW8 with the switching control circuit 11.

Figure 13:
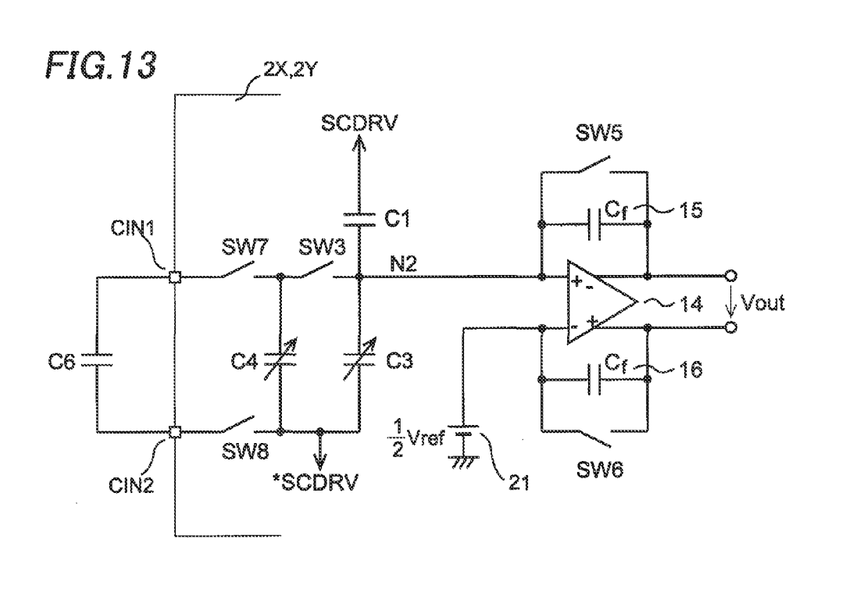
FIG. 13 shows a structure of the second sensor circuit of the single input type.
Figure 14:
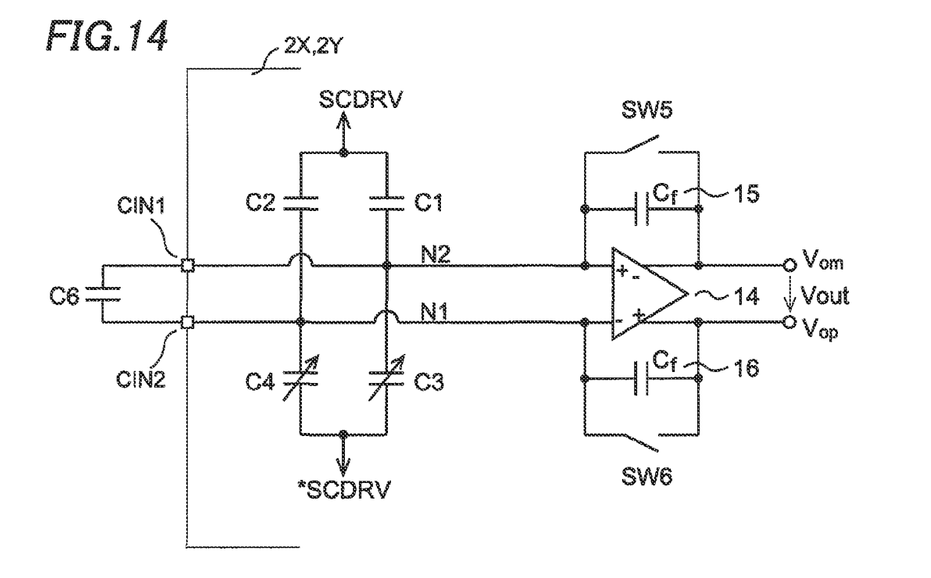
FIG. 14 shows a structure of the first sensor circuit of the differential input type.

The first through fourth input terminals CIN1-CIN4 in each of the signal processing circuits 2X and 2Y may be used instead of providing the dedicated terminals 30 and 31. For example, the external capacitor C6 is connected between the first input terminal CIN1 and the second input terminal CIN2, as shown in FIG. 13. With this, an increase in the number of the terminals can be avoided. In this case, although the external capacitor C6 connected between the first input terminal CIN1 and the second input terminal CIN2 is also connected to the first sensor circuit of the differential input type as shown in FIG. 14, it does not affect the operation of the first sensor circuit.

Figure 6A:
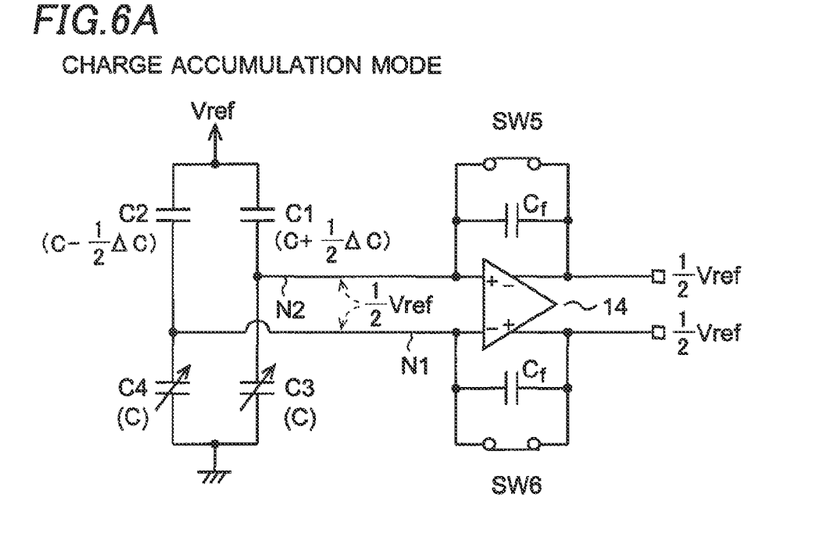
FIGS. 6A and 6B are to explain operations of the first sensor circuit of the differential input type.
Figure 6B:
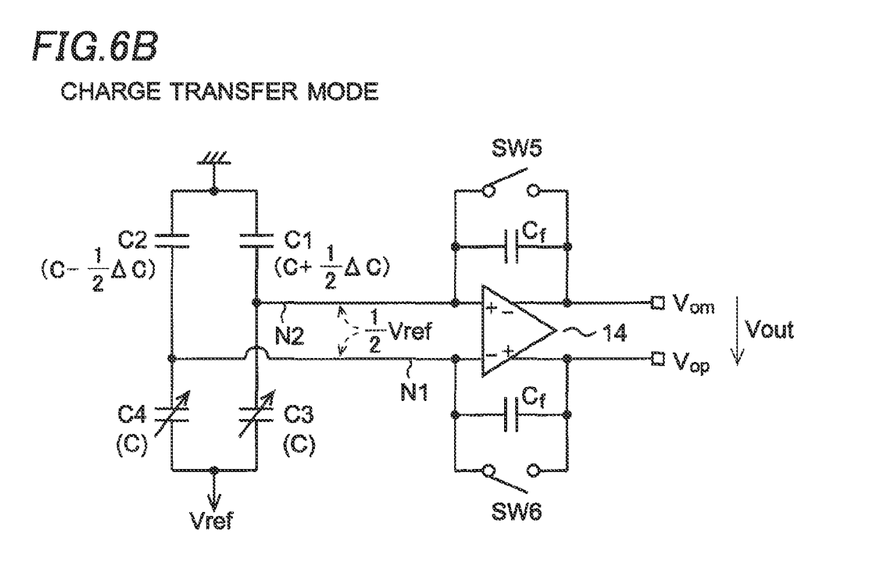
Figure 7:
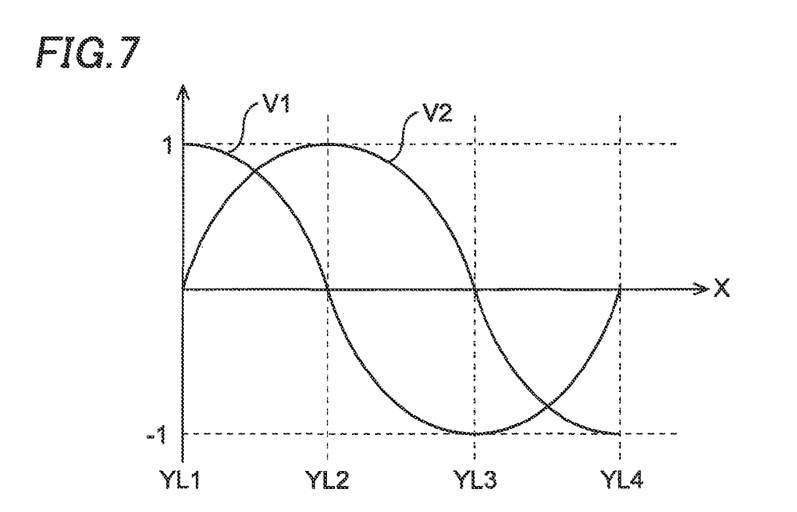
FIG. 7 shows waveforms of outputs of the first sensor circuit of the differential input type.

The operation of the first sensor circuit of the differential input type described above (Refer to FIG. 3.) is explained referring to FIGS. 6A, 6B and 7. The alternating current drive signal SCDRV is a clock signal alternating between a high level (Vref) and a low level (ground voltage=0 V). A voltage difference between an output voltage Vom from the inverting output terminal (−) of the differential amplifier 14 and an output voltage Vop from the non-inverting output terminal (+) of the differential amplifier 14 is the output voltage Vout (=Vop−Vom).

The first sensor circuit has a charge accumulation mode and a charge transfer mode that alternate between each other.

First, when it is in the charge accumulation mode that is shown in FIG. 6A, Vref is applied to the first and second electrostatic capacitors C1 and C2. Also, the ground voltage (0 V) is applied to the third and fourth electrostatic capacitors C3 and C4.

The switches SW5 and SW6 are turned on. With this, the inverting output terminal (−) and the non-inverting input terminal (+) of the differential amplifier 14 are short-circuited, while the non-inverting output terminal (+) and the inverting input terminal (−) are short-circuited. As a result, a voltage at the node N1 (node of the wiring connected to the inverting input terminal (−)), a voltage at the node N2 (node of the wiring connected to the non-inverting input terminal (+)), a voltage at the inverting output terminal (−) and a voltage at the non-inverting output terminal (+) are all set to ½ Vref. A common mode voltage of the differential amplifier 14 in this case is ½ Vref.

Next, when the first sensor circuit is in the charge transfer mode that is shown in FIG. 6B, the ground voltage (0 V) is applied to the first and second electrostatic capacitors C1 and C2, to the contrary of the case in the charge accumulation mode. Also, Vref is applied to the third and fourth electrostatic capacitors C3 and C4. The switches SW5 and SW6 are turned off.

The capacitances CA1, CA2, CA3 and CA4 of the electrostatic capacitors C1, C2, C3 and C4 are equal to each other in the initial state (CA1=CA2=CA3=CA4). A difference between the capacitance CA1 and CA2 when the finger of the operator approaches the touch pad is represented by ΔC (CA1−CA2=ΔC). In this case, CA1=C+½ ΔC, and CA2=C−½ ΔC.

When in the charge accumulation mode shown in FIG. 6A, an amount of electric charges at the node N1 is represented by the following equation:

$$\text{Amount of Electric Charges at } N1 = \left(C - \frac{1}{2}\Delta C\right)\cdot\left(-\frac{1}{2}Vref\right) + C\cdot\left(\frac{1}{2}Vref\right) + CAf\cdot 0 \quad [\text{Equation 1}]$$

where (C−½ ΔC)·(−½ Vref) represents an amount of electric charges stored in C2, C·(½ Vref) represents an amount of electric charges stored in C4, and CAf·0(=0) represents an amount of electric charges stored in Cf.

When in the charge transfer mode shown in FIG. 6B, an amount of electric charges at the node N1 is represented by the following equation:

$$\text{Amount of Electric Charges at } N1 = \left(C - \frac{1}{2}\Delta C\right)\cdot\left(\frac{1}{2}Vref\right) + C\cdot\left(-\frac{1}{2}Vref\right) + CAf\cdot\left(Vop - \frac{1}{2}Vref\right) \quad [\text{Equation 2}]$$

where (C−½ ΔC)·(½ Vref) represents an amount of electric charges stored in C2, C·(−½ Vref) represents an amount of electric charges stored in C4 and CAf·(Vop−½ Vref) represents an amount of electric charges stored in Cf.

[Equation 1]=[Equation 2] holds, since the amount of electric charges at N1 in the charge accumulation mode is equal to the amount of electric charges at N1 in the charge transfer mode according to the law of conservation of electric charge.

Following equation is derived by solving [Equation 1]= [Equation 2] for Vop:

$$Vop = \left(1 + \frac{\Delta C}{CAf}\right)\cdot\frac{1}{2}Vref \quad [\text{Equation 3}]$$

Similarly, following equation is derived by solving for Vom an equation obtained by applying the law of conservation of electric charge to an amount of electric charges at the node N2 in the charge accumulation mode and an amount of electric charges at the node N2 in the charge transfer mode:

$$Vom = \left(1 - \frac{\Delta C}{CAf}\right)\cdot\frac{1}{2}Vref \quad [\text{Equation 4}]$$

Vout is obtained from [Equation 3] and [Equation 4]:

$$Vout = Vop - Vom = \frac{\Delta C}{CAf}\cdot Vref \quad [\text{Equation 5}]$$

It is understood that the output voltage Vout of the first sensor circuit of the differential input type varies in proportion to the difference ΔC between the capacitance CA1 of the first electrostatic capacitor C1 and the capacitance CA2 of the second electrostatic capacitor C2.

It is assumed in the above calculations that CA1=CA2=CA3=CA4. When there is a difference between CA1 and CA2 in the initial state, the offset in the output voltage Vout can be made to a predetermined value or to the minimum value by adjusting CA3 and CA4 using the calibration circuit 19 or the like as described above so that there is the same amount of difference between CA3 and CA4.

Next, characteristics of the output voltage Vout of the first sensor circuit used in the touch sensor are explained referring to Table 2 and FIG. 7. As described above, the selection circuit 10 has the first phase in which it selects the signals from the first input terminal CIN1 and the second input terminal CIN2 and the second phase in which it selects the signals from the third input terminal CIN3 and the fourth input terminal CIN4.

The output voltage Vout of the first sensor circuit in the first phase is represented as V1, while the output voltage Vout of the second sensor circuit in the second phase is represented as V2. In this case, the output voltage V1 is proportional to the difference between the capacitance of the capacitor formed between the Y sense line YL1 and the Y drive line DRYL and the capacitance of the capacitor formed between the Y sense line YL3 and the Y drive line DRYL.

Also, the output voltage V2 is proportional to the difference between a capacitance of a capacitor formed between the Y sense line YL2 and the Y drive line DRYL and a capacitance of a capacitor formed between the Y sense line YL4 and the Y drive line DRYL. Then, the finger of the operator or the like makes a single-touch on the touch panel 1 in a range between the Y sense line YL1 and the Y sense line YL4.

TABLE 2

| Line | Mode | |
|------|------|------|
| | First Phase V1 | Second Phase V2 |
| YL1 | +1 | 0 |
| YL2 | 0 | +1 |
| YL3 | −1 | 0 |
| YL4 | 0 | −1 |

First, when the finger of the operator or the like touches the Y sense line YL1, the first output voltage V1 in the first phase becomes a positive (+) value. This is because the capacitance of the capacitor formed between the Y sense line YL1 and the Y drive line DRYL becomes larger than the capacitance of the capacitor formed between the Y sense line YL3 and the Y drive line DRYL. And the second output voltage V2 in the second phase becomes 0 V. This is because no change is caused in the capacitance related to the Y sense line YL2 or YL4 since the finger of the operator or the like touches only on the Y sense line YL1.

Next, when the finger of the operator or the like touches the Y sense line YL2, the first output voltage V1 in the first phase becomes 0 V. This is because no change is caused in the capacitance related to the Y sense line YL1 or YL3. On the other hand, the second output voltage V2 in the second phase becomes a positive (+) value. This is because the capacitance of the capacitor formed between the Y sense line YL2 and the Y drive line DRYL becomes larger than the capacitance of the capacitor formed between the Y sense line YL4 and the Y drive line DRYL.

Next, when the finger of the operator or the like touches the Y sense line YL3, the first output voltage V1 in the first phase becomes a negative (−) value. This is because the capacitance of the capacitor formed between the Y sense line YL3 and the Y drive line DRYL becomes larger than the capacitance of the capacitor formed between the Y sense line YL1 and the Y drive line DRYL. On the other hand, the second output voltage V2 in the second phase becomes 0 V. This is because no change is caused in the capacitance related to the Y sense line YL2 or YL4 since the finger of the operator or the like touches only on the Y sense line YL3.

Finally, when the finger of the operator or the like touches the Y sense line YL4, the first output voltage V1 in the first phase becomes 0 V. This is because no change is caused in the capacitance related to the Y sense line YL1 or YL3. On the other hand, the second output voltage V2 in the second phase becomes a negative (−) value. This is because the capacitance of the capacitor formed between the Y sense line YL4 and the Y drive line DRYL becomes larger than the capacitance of the capacitor formed between the Y sense line YL2 and the Y drive line DRYL. Maximum absolute values of the first and second output voltages V1 and V2 are normalized to "1" in Table 2 and in FIG. 7.

Note that the explanation above is based on the dielectric model in which the finger of the operator or the like is regarded as a dielectric material and the capacitance of the capacitor related to the sense line increases when the finger of the operator approaches the sense line. Instead, when it is based on an electric field shielding model in which the finger of the operator or the like is regarded as a grounded conductor, the capacitance of the capacitor related to the sense line decreases when the finger of the operator approaches the sense line.

FIG. 7 shows that the first and second output voltages V1 and V2 vary continuously in accordance with the change in the touch position. That is, making a point on the Y sense line YL1 as an origin in FIG. 7 and making the X coordinate axis in FIG. 1 as a horizontal axis in FIG. 7, the first output voltage V1 is approximated by $V1 = \cos X$, and the second output voltage V2 is approximated by $V2 = \sin X$. Therefore, it is possible to detect the touch position (X coordinate) based on the first and second output voltages V1 and V2.

To show an example, since an equation $V2/V1 = \tan X$ holds, the X coordinate of the touch position can be obtained using an equation $X = \arctan(V2/V1)$ and polarities (+, −) of the first and second output voltages V1 and V2. Here, arctan is an inverse function of tan. In this case, the first and second output voltages V1 and V2 are converted into digital values with the AD converter 17 and transmitted to the microcomputer 3 through the I²C bus interface circuit 18 as described above. The X coordinate of the touch position can be obtained by performing the calculation described above with the microcomputer 3.

Figure 8:
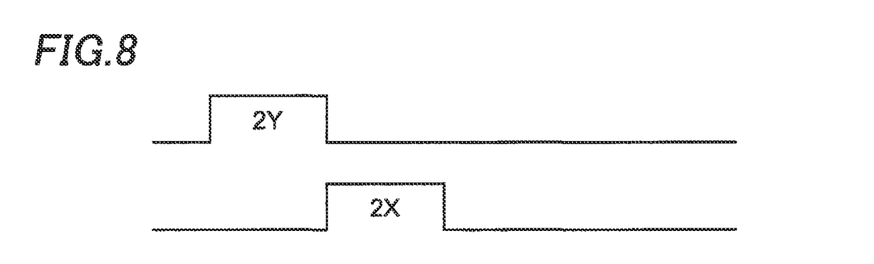
FIG. 8 is an operation timing chart of the signal processing circuit of the electrostatic capacity type touch panel according to the embodiment of this invention.

Similarly, the Y coordinate of the touch position on the X sense lines XL1-XL4 can be detected based on the first and second output voltages V1 and V2 through the operations of the signal processing circuit 2X. The X and Y coordinates of the touch position can be obtained through time-series operations of the signal processing circuits 2X and 2Y as shown in FIG. 8, for example.

In particular, the first sensor circuit of the differential input type has advantages of high sensitivity and high noise tolerance. However, the multi-touch can be not detected with the first sensor circuit in some cases. An example is a case where the finger of the operator touches the Y sense lines YL1 and YL3 simultaneously. Since there is no difference between the capacitance related to the Y sense line YL1 and the capacitance related to the Y sense line YL3 in this case, the first output voltage V1 becomes zero which makes no difference from the initial state.

Figure 9A:
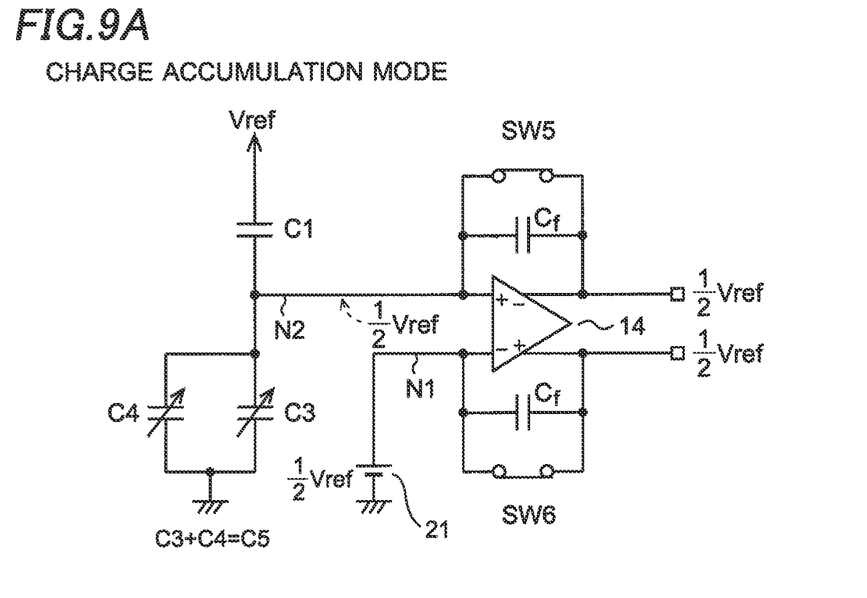
FIGS. 9A and 9B are to explain operations of the second sensor circuit of the single input type.
Figure 9B:
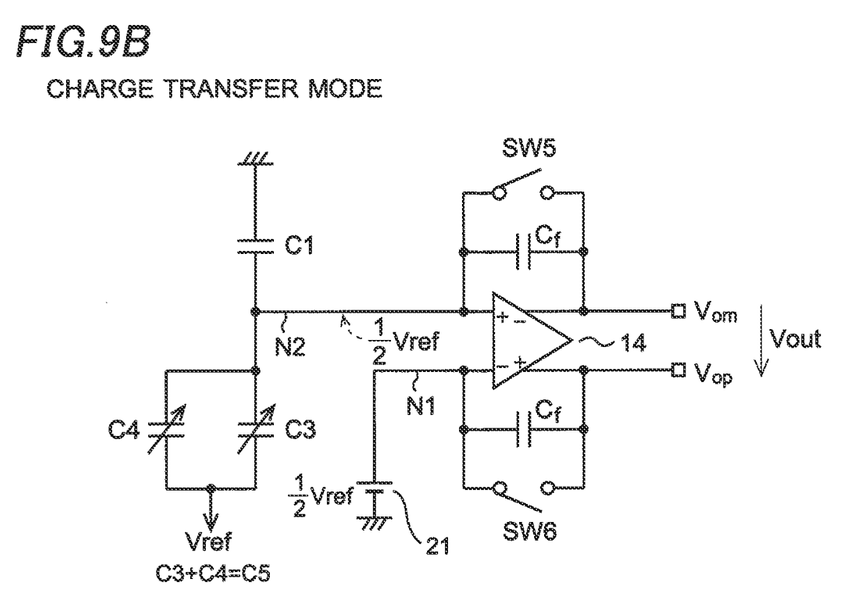

Next, the operation of the second sensor circuit of the single input type described above (Refer to FIG. 4.) is explained referring to FIGS. 9A and 9B. The alternating current drive signal SCDRV is the clock signal alternating between the high level (Vref) and the low level (ground voltage=0 V). A voltage difference between an output voltage Vom from the inverting output terminal (−) of the differential amplifier 14 and an output voltage Vop from the non-inverting output terminal (+) of the differential amplifier 14 is the output voltage Vout (=Vop−Vom).

The switch SW3 is turned on. The third electrostatic capacitor C3 and the fourth electrostatic capacitor C4 are connected in parallel to each other and connected in series with the first electrostatic capacitor C1. The capacitance CA5 of the compound electrostatic capacitor C5 composed of the third electrostatic capacitor C3 and the fourth electrostatic capacitor C4 is a sum of the capacitance CA3 and the capacitance CA4 (CA5=CA3+CA4).

The second sensor circuit has the charge accumulation mode and the charge transfer mode that alternate between each other.

First, when it is in the charge accumulation mode that is shown in FIG. 9A, Vref is applied to the first electrostatic capacitor C1. And the ground voltage (0 V) is applied to the compound electrostatic capacitor C5. The switches SW5 and SW6 are turned on. With this, the inverting output terminal (−) and the non-inverting input terminal (+) of the differential amplifier 14 are short-circuited, while the non-inverting output terminal (+) and the inverting input terminal (−) are short-circuited. As a result, a voltage at the node N1 (node of the wiring connected to the inverting input terminal (−)), a voltage at the node N2 (node of the wiring connected to the non-inverting input terminal (+)), a voltage at the inverting output terminal (−) and a voltage at the non-inverting output terminal (+) are all set to ½ Vref.

Next, when the second sensor circuit is in the charge transfer mode that is shown in FIG. 9B, the ground voltage (0 V) is applied to the first electrostatic capacitor C1, to the contrary of the case in the charge accumulation mode. And Vref is applied to the compound electrostatic capacitor C5. The switches SW5 and SW6 are turned off.

The capacitances are set to be CA1=CA5=C in the initial state. The capacitance CA1 of the first electrostatic capacitor C1 is varied by ΔC with a touch of the finger of the operator or the like. That is, CA1=C+ΔC and CA5=C.

When in the charge accumulation mode shown in FIG. 9A, an amount of electric charges at the node N2 is represented by the following equation:

$$\text{Amount of Electric Charges at } N2 = \quad \text{[Equation 6]}$$

$$(C + \Delta C) \cdot \left(-\frac{1}{2} Vref\right) + C \cdot \left(\frac{1}{2} Vref\right) + CAf \cdot 0$$

When in the charge transfer mode shown in FIG. 9B, an amount of electric charges at the node N2 is represented by the following equation:

$$\text{Amount of Electric Charges at } N2 = \quad \text{[Equation 7]}$$

$$(C + \Delta C) \cdot \left(\frac{1}{2} Vref\right) + C \cdot \left(-\frac{1}{2} Vref\right) + CAf \cdot \left(Vom - \frac{1}{2} Vref\right)$$

[Equation 6]=[Equation 7] holds, since the amount of electric charges at N2 in the charge accumulation mode is equal to the amount of electric charges at N2 in the charge transfer mode according to the law of conservation of electric charge.

Following equation is derived by solving [Equation 6]= [Equation 7] for Vom:

$$Vom = \left(\frac{1}{2} - \frac{\Delta C}{CAf}\right) \cdot Vref \quad \text{[Equation 8]}$$

Similarly, following equation is derived by solving for Vop an equation obtained by applying the law of conservation of electric charge to an amount of electric charges at the node N1 in the charge accumulation mode and an amount of electric charges at the node N1 in the charge transfer mode:

$$Vop = \frac{1}{2} Vref \quad \text{[Equation 9]}$$

Vout is obtained from [Equation 8] and [Equation 9]:

$$Vout = Vop - Vom = \frac{\Delta C}{CAf} \cdot Vref \quad \text{[Equation 10]}$$

It is understood that the output voltage Vout of the second sensor circuit of the single input type varies in proportion to the difference ΔC between the capacitance CA1 of the first electrostatic capacitor C1 and the capacitance CA5 of the compound electrostatic capacitor C5.

It is assumed in the above calculations that CA1=CA5=C in the initial state. When there is a difference between CA1 and CA5 in the initial state, the capacitance CA5 can be adjusted using the calibration circuit 19 or the like as described above so that the offset in the output voltage Vout becomes a predetermined value or the minimum value.

Next, characteristics of the output voltage Vout of the second sensor circuit used in the touch sensor are explained. The selection circuit 10 sequentially selects each of the signals from the first input terminal CIN1, the third input terminal CIN3, the second input terminal CIN2 and the fourth input terminal CIN4 one after another, as described above. For example, each of the Y sense lines YL1, YL2, YL3 and YL4 shown in FIG. 1 is sequentially selected and connected to the second sensor circuit.

Therefore, the second sensor circuit outputs the output voltage Vout that is proportional to a change in a capacitance of a capacitor formed between the Y drive line DRYL and each of the Y sense lines YL1-YL4. Thus, it is possible to detect the touch position based on the output voltage Vout of the second sensor circuit. For example, in the case where the finger of the operator touches the Y sense line YL1, the output voltage Vout becomes large when the Y sense line YL1 is selected.

Unlike with the first sensor circuit of the differential input type, the multi-touch can be stably detected with the second sensor circuit of the single input type, because it selects each of the Y sense lines YL1, YL2, YL3 and YL4 one at a time to detect the change in the capacitance.

Therefore, it is possible to switch between the first and second sensor circuits so that the first sensor circuit of the differential input type is normally put in operation using the single-touch to take the advantages of high sensitivity and high noise tolerance and the second sensor circuit of the single input type is put in operation instead when the multi-touch is desirable.

Switching between the differential input mode and the single input mode is performed by the switching control circuit 11 as described above. The switching control circuit 11 may be structured so as to execute the mode switching operation at receipt of an external command, for example a command transferred from the microcomputer 3 through the serial clock line 4 and the serial data line 5.

Or, the switching control circuit 11 may be structured so as to automatically switch between the differential input mode and the single input mode based on the result of the detection by the sensor. For example, when the finger of the operator or the like is relatively remote from the touch panel 1, the first sensor circuit of the differential input type is put in operation because high sensitivity sensing is required. Then, when the output voltage Vout of the first sensor circuit exceeds a predetermined threshold voltage, switching to the single input mode is executed as the finger of the operator or the like is judged to have approached within a predetermined distance from the touch panel 1 or touched directly to the touch panel 1.

Although the X drive line DRXL and the Y drive line DRYL are provided and the alternating current drive signal SCDRV is supplied from the drive terminals CDRV in the signal processing circuits 2X and 2Y to the X drive line DRXL and the Y drive line DRYL in the structure shown in FIG. 1, it is also possible to utilize the X sense lines XL1-XL4 and Y sense lines YL1-YL4 as the drive lines.

In this case, each of the X sense lines XL1-XL4 is provided with the alternating current drive signal CDRV from the signal processing circuit 2X when the signal processing circuit 2Y is operating as the touch sensor. On the other hand, each of the Y sense lines YL1-YL4 is provided with the alternating current drive signal CDRV from the signal processing circuit 2Y when the signal processing circuit 2X is operating as the touch sensor. With the structure described above, the X drive line DRXL and the Y drive line DRYL and the like are no longer needed. Also, the signal processing circuits 2X and 2Y can be implemented with a single chip.

Different touching methods, that are the single-touch and the multi-touch, can be implemented since switching between the differential input mode and the single input mode is possible with the signal processing circuit of the electrostatic capacity type touch panel according to the embodiment of this invention. For example, the single-touch is normally used to take the advantages of high sensitivity and high noise tolerance available with the differential input mode, and the input mode is switched to the single input mode when the multi-touch is desirable.

Also, since the first and second variable capacitors for calibration are connected in parallel to each other when the second sensor circuit is in operation with the signal processing circuit of the electrostatic capacity type touch panel according to the embodiment of this invention, a variable range of the capacitance of the variable capacitor can be extended to extend the adjustable range of the offset. As a result, it is made possible to adjust the offset even in a large size touch panel.

What is claimed is:

1. A method of forming a signal processing circuit for an electrostatic capacity panel comprising:
    configuring a first sensor circuit to operate in a differential mode and a single-ended mode;
    configuring a first input of the first sensor circuit to receive a first signal from a first sense line;
    configuring a second input of the first sensor circuit to receive a second signal from a second sense line;
    configuring an output of the first sensor circuit to form a first drive signal to apply to a drive line, the first drive signal having an alternating current signal;
    configuring the first sensor circuit to selectively couple an amplifier to operate as a differential amplifier responsively to the first sensor circuit operating in the differential mode and to selectively couple the amplifier to operate as a single-ended amplifier responsively to the first sensor circuit operating in the single-ended mode;
    configuring the first sensor circuit to selectively couple a first variable capacitor to a first input of the amplifier and to couple a second variable capacitor to a second input of the amplifier responsively to the first sensor circuit operating in the differential mode;
    configuring the first sensor circuit to selectively couple the first variable capacitor in parallel with the second variable capacitor and to the second input of the amplifier responsively to the first sensor circuit operating in the single-ended mode; and
    configuring a calibration circuit to determine a difference in value between two capacitors formed between the drive line and the first and second sense lines, and to change a value of one of the first or second variable capacitors to reduce an offset in an output voltage.

2. The method of claim 1 wherein configuring the first sensor circuit to selectively couple the first variable capacitor to the first input of the amplifier includes configuring the first sensor circuit to selectively couple the second variable capacitor in series with a first electrostatic capacitor of the two capacitors, the first electrostatic capacitor formed between the first sense line and the drive line, and to selectively couple the first variable capacitor in series with a second electrostatic capacitor of the two capacitors, the second electrostatic capacitor formed between the second sense line and the drive line.

3. The method of claim 1 wherein configuring the first sensor circuit to selectively couple the first variable capacitor in parallel with the second variable capacitor includes configuring the first sensor circuit to selectively couple a first electrostatic capacitor, of the two capacitors, in series with the parallel combination of the first and second variable capacitors wherein the first electrostatic capacitor is formed between the first sense line and the drive line.

4. The method of claim 1 further including configuring a calibration circuit determine a difference in value between a first electrostatic capacitor formed between the first sense line and the drive line and one of the first or second variable capacitors, and to change a value of one of the first or second variable capacitors to reduce the difference in value.

5. The method of claim 4 further including configuring the signal processing circuit to store the change in the value of the one of the first or second variable capacitors and to selectively read-out the stored change in the value.

6. A method of forming a signal processing circuit for an electrostatic capacity panel comprising:
    configuring a sensor circuit to selectively couple an amplifier to operate as a differential amplifier responsively to the sensor circuit operating in a differential mode and to selectively couple the amplifier to operate as a single-ended amplifier responsively to the sensor circuit operating in a single-ended mode;
    configuring the first sensor circuit to selectively couple a first variable capacitor to a first input of the amplifier responsively to coupling the amplifier to operate as the differential amplifier and further including coupling a second variable capacitor to a second input of the amplifier;
    configuring the first sensor circuit to selectively couple the first variable capacitor in parallel with the second variable capacitor and to the second input of the amplifier responsively to coupling the amplifier to operate as the single-ended amplifier; and
    configuring a calibration circuit to determine a difference in value between two capacitors formed between a drive line and different sense lines and to change a value of one of the first or second variable capacitors to reduce an offset in an output voltage.

7. The method of claim 6 further including configuring the first sensor circuit to selectively couple a reference voltage to the first input of the amplifier responsively to coupling the amplifier to operate as the single-ended amplifier.

8. A method of forming a signal processing circuit for an electrostatic capacity panel comprising:
    configuring a sensor circuit to selectively couple an amplifier to operate as a differential amplifier responsively to the sensor circuit operating in a differential mode and to selectively couple the amplifier to operate as a single-ended amplifier responsively to the sensor circuit operating in a single-ended mode;
    configuring the first sensor circuit to selectively couple a first variable capacitor to a first input of the amplifier responsively to coupling the amplifier to operate as the differential amplifier and further including coupling a second variable capacitor to a second input of the amplifier;
    configuring the first sensor circuit to selectively couple the first variable capacitor in parallel with the second variable capacitor and to the second input of the amplifier responsively to coupling the amplifier to operate as the single-ended amplifier; and configuring a calibration circuit to determine a difference in value between a first electrostatic capacitor formed between the first sense line and the drive line, and one of a first variable capacitor and a second variable capacitor and to change a value of one of the first or second variable capacitors to reduce the difference in value.

9. The method of claim 6 further including configuring the signal processing circuit to store the change in value and to read-out the change in value that was stored.

10. The method of claim 6 wherein configuring the first sensor circuit to selectively couple the first variable capacitor to the first input of the amplifier responsively to coupling the amplifier to operate as the differential amplifier includes configuring a first switch to selectively couple the first variable capacitor to the first input of the amplifier responsively to coupling the amplifier to operate as the differential amplifier.

11. The method of claim 10 wherein configuring the first sensor circuit to selectively couple the first variable capacitor in parallel with the second variable capacitor and to the second input of the amplifier responsively to coupling the amplifier to operate as the single-ended amplifier includes configuring a second switch to selectively couple the first variable capacitor in parallel with the second variable capacitor and configuring a third switch to selectively couple the first variable capacitor in parallel with the second variable capacitor.

* * * * *